US010875673B2

(12) United States Patent
Manaresi et al.

(10) Patent No.: US 10,875,673 B2
(45) Date of Patent: Dec. 29, 2020

(54) CALIBRATED COUPLING STATION FOR COMPONENTS OF CAPSULES AND APPARATUS FOR PREPARING SUCH CAPSULES

(71) Applicant: GIMA S.P.A., Zola Predosa (IT)

(72) Inventors: Giorgio Manaresi, Rome (IT); Luca Benni, Bologna (IT)

(73) Assignee: GIMA S.P.A., Zola Predosa (IT)

( * ) Notice: Subject to any disclaimer, the term of this patent is extended or adjusted under 35 U.S.C. 154(b) by 677 days.

(21) Appl. No.: 15/314,427

(22) PCT Filed: May 25, 2015

(86) PCT No.: PCT/IB2015/053867
§ 371 (c)(1),
(2) Date: Nov. 28, 2016

(87) PCT Pub. No.: WO2015/181705
PCT Pub. Date: Dec. 3, 2015

(65) Prior Publication Data
US 2017/0096243 A1    Apr. 6, 2017

(30) Foreign Application Priority Data

May 28, 2014 (IT) ............................. BO2014A0314

(51) Int. Cl.
*B65B 29/02* (2006.01)
*B65B 51/14* (2006.01)
*B65B 61/20* (2006.01)

(52) U.S. Cl.
CPC ............ *B65B 29/02* (2013.01); *B65B 29/022* (2017.08); *B65B 51/14* (2013.01); *B65B 61/20* (2013.01)

(58) Field of Classification Search
CPC ........ B65B 29/02; B65B 29/022; B65B 51/14
See application file for complete search history.

(56) References Cited

U.S. PATENT DOCUMENTS 3,385,025 A * 5/1968 Lemelson ................ B65B 3/02
53/453
4,549,389 A   10/1985 Zichy
(Continued)

FOREIGN PATENT DOCUMENTS

EP      2093148 A1    8/2009
WO    2013064988 A1    5/2013
(Continued)

OTHER PUBLICATIONS

International Search Report dated Aug. 3, 2015 re: Application No. PCT/IB2015/053867; pp. 1-4; citing: EP 2 093 148 A1, WO 20141060838 A1, U.S. Pat. No. 4,549,389 A, US 2008/314256 A1, WO 2013/064988 A1 and WO 2013/189555 A1.
(Continued)

*Primary Examiner* — Christopher M Koehler
*Assistant Examiner* — Kyle A Cook
(74) *Attorney, Agent, or Firm* — Cantor Colburn LLP

(57) ABSTRACT

A calibrated coupling station for components of capsules includes an external body and a bag. A through seat for stably housing the external body supports the bag and is arranged on an articulated sector of a respective advancement component movable along a frame. At least one grip element is aligned with a predefined stop area of the at least one through seat and is movable from a raised configuration in which its terminal end rests on a bottom of the bag, in turn juxtaposed against an inner face of the base of the external body/The grip element is adapted to define an intermediate configuration for a calibrated positioning in which the terminal end, stably coupled to the bottom of the bag, is arranged at a predefined distance from the inner face of the base of the external body.

10 Claims, 12 Drawing Sheets

(56) References Cited

U.S. PATENT DOCUMENTS

| | | | | |
|---|---|---|---|---|
| 5,373,933 | A | * 12/1994 | Planke | ............... B65G 21/2036 |
| | | | | 198/689.1 |
| 5,517,723 | A | * 5/1996 | Sircy | ................... G02C 5/2281 |
| | | | | 16/228 |
| 2008/0314256 | A1 | 12/2008 | Smith | |
| 2009/0211713 | A1 * | 8/2009 | Binacchi | ............... B65B 61/065 |
| | | | | 156/423 |
| 2015/0246741 | A1 * | 9/2015 | Hansen | ................... B65B 29/02 |
| | | | | 426/112 |
| 2016/0214747 | A1 * | 7/2016 | Carisi | .................... B65B 29/02 |

FOREIGN PATENT DOCUMENTS

| | | | |
|---|---|---|---|
| WO | 2013189555 | A1 | 12/2013 |
| WO | 2014060838 | A1 | 4/2014 |

OTHER PUBLICATIONS

Written Opinion dated Aug. 3, 2015 re: Application No. PCT/IB2015/053867; pp. 1-6; citing: EP 2 093 148 A1, WO 2014/060838 A1, U.S. 4,549,389 A and US 2008/314256 A1.

* cited by examiner

CALIBRATED COUPLING STATION FOR COMPONENTS OF CAPSULES AND APPARATUS FOR PREPARING SUCH CAPSULES

CROSS-REFERENCE TO RELATED APPLICATIONS

This application is related to and claims the benefit of Italian Patent Application No. BO2014A000314, filed on May 28, 2014, the contents of which are herein incorporated by reference in their entirety.

TECHNICAL FIELD

The present disclosure relates to a calibrated coupling station for components of capsules and to an apparatus for preparing such capsules.

The capsules to which the present disclosure mainly relates are the ones used to obtain infusion or extraction beverages (such as for example coffee, tea and the like).

BACKGROUND

This type of capsule generally comprises a container made of non-permeable material (for example polymeric, metallic, composite laminates, multi-material layered materials and the like), provided with a base and an upper opening, within which a bag or filter is fixed which has a bottom and a side wall made of permeable material (for example filter paper, porous polymeric sheets, fabric sheets, non-woven fabric sheets, layered sheets and the like) within which a product (in the form of powder, granules and the like) to be subjected to infusion and/or extraction is accommodated: the container is usually surmounted by a closure flap that isolates the product from the environment.

The container is substantially shaped like a cup or vase or the like (having many geometric similarities with a frustum or a cylinder). The bag has a substantially frustum-like shape: according to a particularly widespread and appreciated constructive solution, the side wall has a pleating which makes its shape similar to a so-called cupcake liner.

The apparatuses intended for the preparation and the formation of the described capsules have stations at which the bag is coupled (generally by heat-sealing) to an inner lateral surface of the container.

Apparatuses of the known type substantially comprise a supporting frame for container advancement means and for means for the provision and insertion of the bag in the container. The provision and insertion means are of the compact type and comprise a first cutting unit (in which a circular blade cuts a portion of filtering material from a continuous ribbon) and a pusher piston (which conveys the portion of filtering material into a formation hopper, adapted to give said portion of filtering material the substantially frustum-like shape with pleated lateral surfaces, and then into the container, which is kept below the formation hopper on the container advancement means).

A problem that is felt in these known machines relates to the imperfect outcome of the frustum-like shape with pleated side walls of the bag, which entails subsequent problems in heat-sealing the bag to the container and the provision of packages of poor quality or to be discarded, with consequent economic loss and possible interruptions (machine downtime) in the preparation operations of the apparatus.

In particular, in these known apparatuses it is necessary to use corresponding and complex devices for placing the bag inside the container.

Moreover, these known machines use a device for providing and inserting the bag that is excessively complicated, is difficult to assemble, and is complicated to maintain and repair.

For some specific applications, the bag must be fixed to the container according to strict dimensional parameters. In particular, in the capsule (i.e., in the finished product provided by the preparation apparatus) the bottom of the bag must be at a preset distance, with reduced tolerance, from an inner surface of the base of the container.

However, apparatuses of the known type do not allow to define precisely the distance indicated above and therefore do not allow to maintain constant quality levels of the capsules being provided. It is specified that a capsule in which the indicated distance does not have the desired value might not allow a correct flow of infusion and/or extraction liquid or might cause a rupture of the bag at the bottom (due to nozzles and needles during infusion/extraction), with consequent leakage of product which would contaminate the beverage being provided.

SUMMARY

The aim of the present disclosure is to solve the problems described above, by devising a calibrated coupling station that allows to establish precisely the mutual position of the container and of the bottom of the bag.

Within this aim, the disclosure devises provides a calibrated coupling station for components of capsules that ensures a production with a provision quality that is constant over time.

The disclosure further provides an apparatus for preparing capsules that ensures the correct provision of the frustum-like shape with pleated side walls (a so-called "cupcake liner" shape) of the bag in order to avoid problems of incorrect heat-sealing of the bag to the shell/container, any reductions in the quantity of the packages of poor quality or to be discarded with a corresponding reduction of the consequent machine downtimes.

The disclosure also provides an apparatus for preparing capsules that does not require the use of complex and expensive devices for placing the bag inside the container.

The disclosure further provides an apparatus for preparing capsules that is adapted to provide and insert the bag in the container in a simple manner and does not require components that entail difficult assembly and complex maintenance and repair.

The present disclosure also provides a calibrated coupling station for capsule components and an apparatus for packaging said capsules that have a low cost, are relatively simple to provide in practice and are safe in application.

These features and advantages are achieved by providing a calibrated coupling station comprising an external body and a bag made of filter material, the station comprising a through seat for stably housing said external body that supports said bag, arranged on an articulated sector of respective advancement means movable along a frame, further comprising at least one grip element aligned with a predefined stop area of said through seat and comprising a terminal end, the grip element being movable, by means of a respective first actuation assembly, from a raised configuration in which the terminal end faces and is proximate to said through seat, said terminal end being arranged above said through seat, to a lowered configuration in which the terminal end rests on a bottom of the bag, in turn juxtaposed against an inner face of a base of the external body, the grip element defining an intermediate configuration for calibrated positioning in which said terminal end, stably coupled to said bottom of said bag, is arranged at a predefined distance from the inner face of the base of the external body, said grip element, in said intermediate configuration for calibrated positioning of said bag with respect to said external body, being substantially aligned with a heat-sealing assembly to firmly couple said bag and said external body according to a mutual arrangement defined by said intermediate configuration.

These features and advantages are also achieved by means of a calibrated coupling method including the steps of: aligning a through seat that accommodates said external body that supports said bag with a grip element adapted to retain the bag and with a lower retention member adapted to support the external body, coupling a terminal end of the grip element with an inner surface of the bottom of said bag and coupling a terminal end of the lower retention member to an external face of the base of the external body, retaining said bottom with the grip element and said base with the lower retention member so that they are superimposed and in mutual contact, spacing said bottom from said base by a predefined distance, and stably coupling said bag to said external body.

These features and advantages are also achieved by providing an apparatus for preparing capsules containing an infusion or extraction product and comprising an external body and a bag made of porous and/or filtering material configured like a cupcake liner; the apparatus comprising a supporting frame, advancement means for advancing the external body along an advancement direction and a provision and insertion unit for providing and inserting the bag in the external body; wherein said provision and insertion unit comprises a provision device for providing the bag, an insertion device for inserting the bag within the external body, and a conveyance device for conveying the bag from the provision device to the insertion device, the provision device being arranged upstream, or downstream, of the insertion device along the advancement direction, and wherein the apparatus further comprises a calibrated coupling station for components of capsules.

BRIEF DESCRIPTION OF THE DRAWINGS

Further characteristics and advantages of the disclosure will become better apparent from the description of a preferred but not exclusive embodiment of the calibrated coupling station for components of capsules and of the apparatus for preparing capsules according to the disclosure, illustrated by way of non-limiting example in the accompanying drawings, wherein.

DETAILED DESCRIPTION OF THE DRAWINGS

Figure 1:
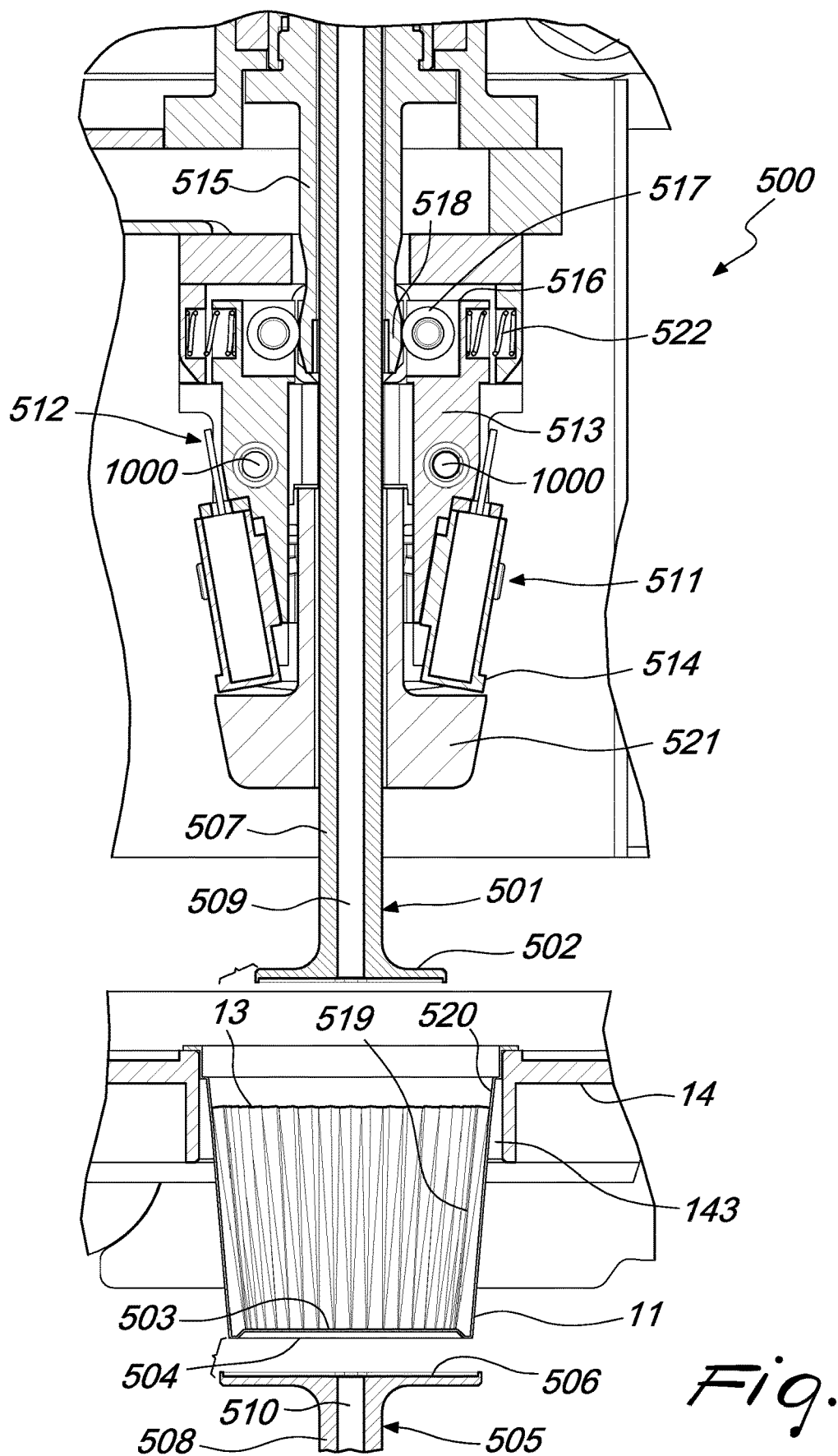
FIG. 1 is a sectional front view, taken along a substantially transverse plane, of a calibrated coupling station according to the disclosure in a raised configuration of a respective grip element and a lowered configuration of a respective retention member.
Figure 2:
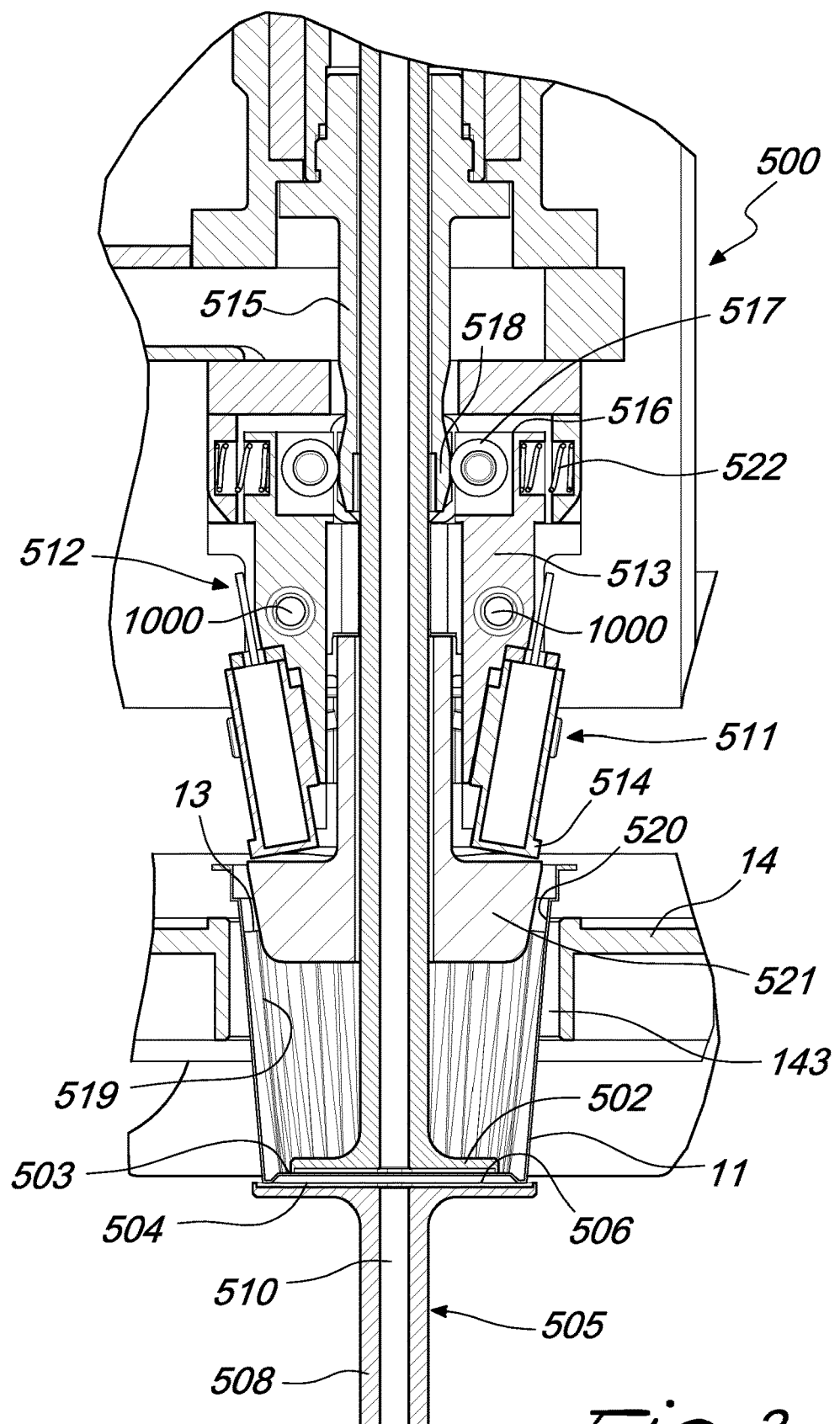
FIG. 2 is a sectional front view, taken along a substantially transverse plane, of the station of FIG. 1 in a lowered configuration of the grip element and a raised configuration of the retention member.

With particular reference to the figures, the numeral 500 generally designates a calibrated coupling station for components of capsules and the numeral 10 designates an apparatus for preparing said capsules.

The calibrated coupling station 500 is intended to operate on components of capsules of the type that preferably comprises an external body 11 (also termed container), which is not permeable and is shell-shaped, and a bag 13 (also termed filter), which is substantially frustum-shaped.

The use of the coupling station to provide capsules constituted by different components (such as for example non-permeable shells 11 and/or bags 13 that have a particular geometric shape, for example a hemispherical, hemiellipsoidal, variously contoured shape and the like), is not excluded.

The external body 11 is provided with a base 504, a side wall with the corresponding inner side wall 520, and an upper opening.

The bag 13, according to a constructive solution of unquestionable interest in practice and in application, can be preferably shaped like a cupcake liner with a pleated side wall and has a preferably flat bottom 503.

In the present description, reference shall be made predominantly to capsules intended for coffee machines, but it is expected that the present disclosure might also operate on capsules of a different kind and intended for different purposes.

The station 500 according to the disclosure comprises, like those of the known type, a through seat 143 for the stable accommodation of the external body 11, in particular when the latter supports in turn the bag 13. The seat 143 is arranged on an articulated sector of respective advancement means 14, which can move with respect to a frame 12.

The calibrated coupling station 500 comprises at least one grip element 501 that is aligned with a predefined stop area of at least one through seat 143.

The grip element 501 comprises a terminal end 502 and can move, by way of the action of a first actuation assembly, from a raised configuration, in which the terminal end 502 faces and is proximate to the seat 143, surmounting it, to a lowered configuration, in which the terminal end 502 rests against an inner surface of the bottom 503 of the bag 13, which in turn is juxtaposed against an inner face of the base 504 of the external body 11.

The grip element 501 further defines an intermediate configuration for calibrated positioning, in which the terminal end 502 stably coupled to the bottom 503 of the bag 13 is arranged at a predefined distance from the inner face of the base 504 of the external body 11.

In the intermediate configuration, the grip element 501 is substantially aligned with a heat-sealing assembly 511.

It is specified that the intermediate configuration allows to position precisely the bag 13 with respect to the external body 11.

Once the bag 13 and the external body 11 have been mutually arranged according to the so-called intermediate configuration, it is possible to couple them stably for example by heat-sealing (the possibly to use gluing or other joining processes is not excluded).

With particular reference to an efficient constructive solution that is suitable to ensure precisely the correct coupling of the bag 13 to the body 11, the station 500 may further comprise at least one lower retention member 505, which is aligned with a predefined stop area of at least one through seat 143: obviously, said stop area will be the same one at which the advancement means 14 have stopped in alignment with the grip element 501.

The lower retention member 505 has a terminal end 506 and can move, by way of the action of a second actuation assembly, from a lowered configuration, in which the terminal end 506 is spaced from the seat 143, to a raised configuration, in which the terminal end 506 contacts and supports the external body 11 at an external face of the base 504.

The lower retention member 505 and the grip element 501 define together the intermediate configuration for calibrated placement in which the terminal end 502 of the grip element 501 (which is coupled stably to the bottom 503 of the bag 13) is arranged at a predefined distance from the inner face of the base 504 of the external body 11 (said base 504 having an external face which in turn is coupled stably to the terminal end 506 of the lower retention member 505).

It is specified that, by having an upper grip element 501 and a lower retention member 505, the external body 11 and the bag 13 are retained and mutually arranged with extreme accuracy, with a considerable increase in precision with respect to what can be obtained with devices of the known type; in other words, the distance between the bottom 503 and the base 504 is imposed with extreme accuracy.

The at least one grip element 501 and the at least one lower retention member 505 respectively comprise a first hollow shaft 507 and a second hollow shaft 508, which translate, with respect to the frame 12, in a direction that is perpendicular to a plane that contains the articulated sector provided with the seat 143: translation is possible by way of the presence of respective actuators, of a known type, which are not shown in the accompanying figures (since they are irrelevant for the definition of the characteristics of the present disclosure).

The first hollow shaft 507 and the respective actuator constitute the first actuation assembly of the grip element 501, while the second hollow shaft 508 and the respective actuator constitute the second actuation assembly of the retention member 505.

With reference to the previously described embodiment, the shafts 507 and 508 are provided with internal cavities 509 and 510 that lead, with the interposition of flow control valves controlled by means of a specific control and management unit, to respective pneumatic circuits in partial vacuum.

The cavities 509 and 510 have, at the respective terminal ends 502 and 506, corresponding openings toward the outside environment.

Substantially, the grip elements 501 and the retention members 505 act as suckers in order to retain respectively the bag 13 and the external body 11.

Advantageously, the terminal end 502 of the grip element 501 and the terminal end 506 of the lower retention member 505 have a substantially disk-like shape, with a diameter that is close to that of the inner surface of the bottom 503 of the bag 13 and of the external face of the base 504 of the external body 11, respectively.

The terminal end 502 of the grip elements 501 in fact must have a diameter that is similar to, or slightly smaller than, the diameter of the bottom 503 of the bag 13, while the terminal end 506 has a diameter that is preferably close to that of the base 504 of the body 11 (in this second case, the diameter of the terminal end might also be greater or smaller than that of the bottom of the body 11, so long as it is large enough to ensure a firm grip on the base 504 of said external body 11).

The coupling station 500 also comprises a heat-sealing assembly 511, which is fitted on the shaft 507 and can translate coaxially along it by way of the action of a respective actuator (the actuator is not described specifically and is not shown in the accompanying figures, since it can be any linear actuator of a known type).

The heat-sealing assembly 511 is provided with a carousel 512, which comprises respective sectors 513 that are pivoted around respective pivots 1000 and define a tubular cover. A respective heat-sealing wing 514 is arranged at a first end of each sector 513.

The fact that the sectors 513 are pivoted to the carousel 512 ensures that they can move, arranging their end provided with the respective heat-sealing wing 514 proximate to said carousel 512 (defining the minimum radial space occupation that is needed to perform the translations without interfering with any other component and/or with the external body 11 or with the bag 13) or at a predefined radial distance from the carousel 512 (defining the maximum radial space occupation required to achieve the sealing of the bag 13 on the external body 11, as will become better apparent hereinafter).

More specifically, it is pointed out that the sectors 513 are pivoted to the carousel 512 at the pivots 1000, which are arranged substantially proximate to the centerline of said sectors 513. This means that the sectors 513 can rotate about the respective pivots 1000, varying the distance between their ends and the carousel 512. Specifically, it is stressed that the lower end of each sector is provided with a heat-sealing wing 514, which thus can move from a first limit configuration of maximum distance from the carousel 512 (which corresponds to a radial spacing from the carousel 512 due to a rotation of the sector 513 with respect to its own pivot 1000), to a second limit configuration of minimum distance from the carousel 512 (which corresponds to a radial approach to the carousel 512 caused by a rotation, which is opposite with respect to the one described previously, of the sector 513 with respect to its own pivot 1000).

The carousel 512 can translate coaxially to the shaft 507 along a sleeve 515, which also can move with respect to the frame 12 along a predefined stroke that is independent with respect to the stroke of the shaft 507.

At a second end 516, which is opposite the first end on which the heat-sealing wings 514 are arranged, the sector 513 is provided with a respective feeler 517, which is forced elastically against a contoured section 518 of the sleeve 515.

Upon a vertical translation of the sleeve 515, when the carousel 512 is motionless, the feeler 517 translates radially with respect to the shaft 507, continuing to rest against the contoured section 518, with consequent rotation of the corresponding sector 513 about the pivot 1000.

The rotation of the sector 513 occurs between the second limit configuration (already defined previously), in which the heat-sealing wings 514 face and are proximate to an inner lateral surface 519 of the bag 13 (which corresponds to a minimal radial space occupation) and a first limit configuration (already defined previously), in which the heat-sealing wings 514 abut by elastic forcing against the inner lateral surface 519, pressing an external lateral surface of the bag 13 against the inner side wall 520 of the external body 11 (which corresponds to a maximum radial space occupation).

It is noted that the heat-sealing assembly 511 comprises a plug 521, which is arranged substantially below the heat-sealing wings 514 in order to widen the bag 13 at the second limit configuration (minimum radial space occupation) and in order to ensure that during the translation of the heat-sealing assembly 511 toward the bag 13 the heat-sealing wings 514 do not collide with the bag 13 and do not move said bag 13 with respect to the external body 11.

The plug 521 is substantially frustum-shaped and ensures that the lateral wall of the bag 13 is pressed against the inner side wall 520 of the external body 11, in order to ensure that the subsequent mutual heat-sealing operations (provided by the heat-sealing wings 514) are performed precisely on correctly juxtaposed surfaces.

Elastic elements 522 are interposed between the second end 516 of the sector 513 and the carousel 512 and force the feeler 517 on the contoured section 518 of the sleeve 515. In practice, the contoured sleeve 515 constitutes a cam for the feeler 517, which behaves like a cam follower. In detail, the feeler 517 undergoes movements in a radial direction by sliding on the sleeve 515 and therefore defines the rule of motion according to which the rotations of each sector 513 about the pivot 1000 occur.

Each feeler 517 comprises a free roller, which can rotate freely on the contoured sleeve 515: this ensures that the sliding of the feeler 517 occurs on the contoured section 518, minimizing friction (the feeler 517 thus acts as a cam follower of the rolling type).

The present disclosure further defines a calibrated coupling method for components of capsules comprising an external body 11, i.e., a non-permeable shell-shaped container, and a bag 13, i.e., a substantially frustum-shaped filter.

The method according to the disclosure comprises a plurality of consecutive steps.

A first step aligns a through seat 143 that accommodates the external body 11, which in turn supports the bag 13, with an upper grip element 501 and with a lower retention member 505.

In a second step it is necessary to make the terminal end 502 of the grip element 501 match up with the inner surface of the body 503 of the bag 13 and make the terminal end 506 of the lower retention member 505 match up with the external face of the base 504 of the body 11. This step must be performed while retaining the bottom 503 with the grip element 501 and the base 504 with the lower retention member 505 in conditions of overlap and mutual contact. The grip element 501 retains the bottom 503 and the lower retention member 505 retains the base 504 preferably by means of channeled pneumatic suction.

In a third step it is necessary to provide the spacing, according to a predefined distance, of the bottom 503, retained by the terminal end 502 of the lower retention member 505, from the base 504, which is retained by the terminal end 506 of the grip element 501.

Said third step allows to define precisely the distance of the bottom 503 of the bag 13 from the base 504 of the external body 11, a parameter which must characterize with extreme precision the capsule in its final version.

In particular, said third step allows to define a distance between an inner face of the base 504 of the external body 11 and an external surface of the bottom 503 of the bag 13.

According to the teachings of a fourth step, it is necessary to couple stably the external body 11 and bag 13, while the bottom 503 and the base 504 are retained at the predefined distance respectively by the upper grip element 501 and by the lower retention member 505.

Preferably, the stable coupling of the fourth step is provided by heat-sealing the bag 13 to the body 11.

The adoption of other methods for mutual coupling of the bag 13 to the body 11 is in any case not excluded.

The present disclosure relates further to an apparatus 10 for preparing a product in single-use capsules for respective infusion machines to obtain a corresponding beverage, preferably in the form of coffee or based on coffee, particularly to obtain a filter coffee.

The capsule is of the type that comprises an external supporting body 11, preferably having the general shape of a frustum-like cup, which is adapted to accommodate and retain internally a respective bag 13, which in particular is shaped like a cupcake liner, which in turn is adapted to contain a dose of product.

The bag 13 is preferably made of a suitable porous or filtering material, for example filter paper.

In particular, the external supporting body 11 of the capsule is conveniently contoured so as to be arranged in corresponding contoured cavities of the infusion machine during the operation for infusion of the beverage.

In turn, the bag 13 comprises a preferably circular bottom, from which a peripheral wall protrudes which is flared in a direction that is transverse to the bottom, is concertina shaped (pleated) and is obtained by means of a plurality of longitudinal folding lines.

The apparatus 10 comprises means 14 for the advancement of the external body 11 or of the capsule being prepared, which can move along an advancement direction A, along a respective operating path between various operating stations of the apparatus. The advancement means 14 are preferably in the form of an endless conveyor belt 141 with articulated sectors, which can rotate on respective end wheels, of which only one, designated by the reference numeral 142, is shown in the accompanying figures.

As shown, the endless conveyor belt 141 defines a plurality of cavities or seats 143 for the accommodation and support of a respective external body 11 of the capsule.

In particular, the presence is provided of a plurality of parallel rows of seats 143 along the advancement direction A (in the illustrated embodiment the parallel rows are six in number) for the simultaneous and parallel advancement of a plurality of external bodies 11 or capsules being prepared.

The apparatus 10 comprises further, in sequence along the advancement direction A, a station 16 for providing and inserting the bag 13 inside the external body 11 of the capsule, a joining station 18 for joining, in particular for heat-sealing, the bag 13 to the external body 11 of the capsule, a filling station 20 for filling the bag with a dose of product, and a closure station 21 (shown schematically in FIG. 1) to close the external body 11 with a closure sheet.

The apparatus 10 comprises further a fixed frame 12, which supports the advancement means 14, the station 16 for the provision and insertion of the bag 13, the joining station 18, the filling station 20 and the closure station 21.

Advantageously, the station 16 for the provision and insertion of the bag 13 comprises at least one working unit 160 for providing and inserting the bag 13, which comprises respectively a device 161 for providing the bag 13, a device 162 for inserting the bag 13 in the external body 11 of the capsule, and a device 163 for conveying the bag 13 in order to convey the bag 13 from the provision device 161 to the insertion device 162.

Conveniently, the apparatus 10 comprises a first working unit and a second working unit 160, 160 for the provision and insertion of the bag 13, which comprise respectively a first device and a second device 161 for providing the bag 13, a first device and a second device 162 for inserting the bag 13 in the external body 11 of the capsule, and a first device and a second device 163 for conveying the bag 13, in order to convey the bag 13 from the first and second provision device 161 to the first and second insertion device 162 respectively.

In this manner it is possible to uncouple the operation for providing the bags from the operation for insertion of said bag within the external body of the capsule, with an advantage as regards quality of the execution of these operations and the constructive and maintenance simplification of the devices used.

In particular, it is possible to obtain a bag that is shaped like a cupcake liner and has a better shape, as will become better apparent also from the continuation of the present description, and also to obtain a better insertion of the bag within the external body of the capsule, thus being able to omit corresponding devices for placing and adjusting the bag within the external body of the capsule, as occurred for machines according to the background art.

In practice, the respective devices 161, 161 for providing the bag and the respective devices 162, 162 for inserting the bag 13 in the external body 11 of the capsule are mutually spaced along the advancement direction A and in particular are mutually spaced longitudinally.

In particular, in the first working unit 160, which is arranged upstream of the second working unit 160 along the advancement direction A, the first device 162 for inserting the bag 13 within the external body 11 of the capsule is provided upstream with respect to the first device 161 for providing the same bag along the advancement direction A.

Differently, in the second working unit 160 arranged downstream of the first working unit 160 along the advancement direction A, the second device 162 for inserting the bag 13 is provided downstream with respect to the second device 161 for providing the bag 13 along the advancement direction A.

Advantageously, the first and second units 160, 160 for providing and inserting the bag 13 within the external body 11 of the capsule operate on a single ribbon 15 of filter material.

In particular, the first and second units 160, 160 for providing and inserting the bag 13 are mutually adjacent along the advancement direction A and are transversely offset, particularly transversely offset by a row of seats 143.

Figure 3:
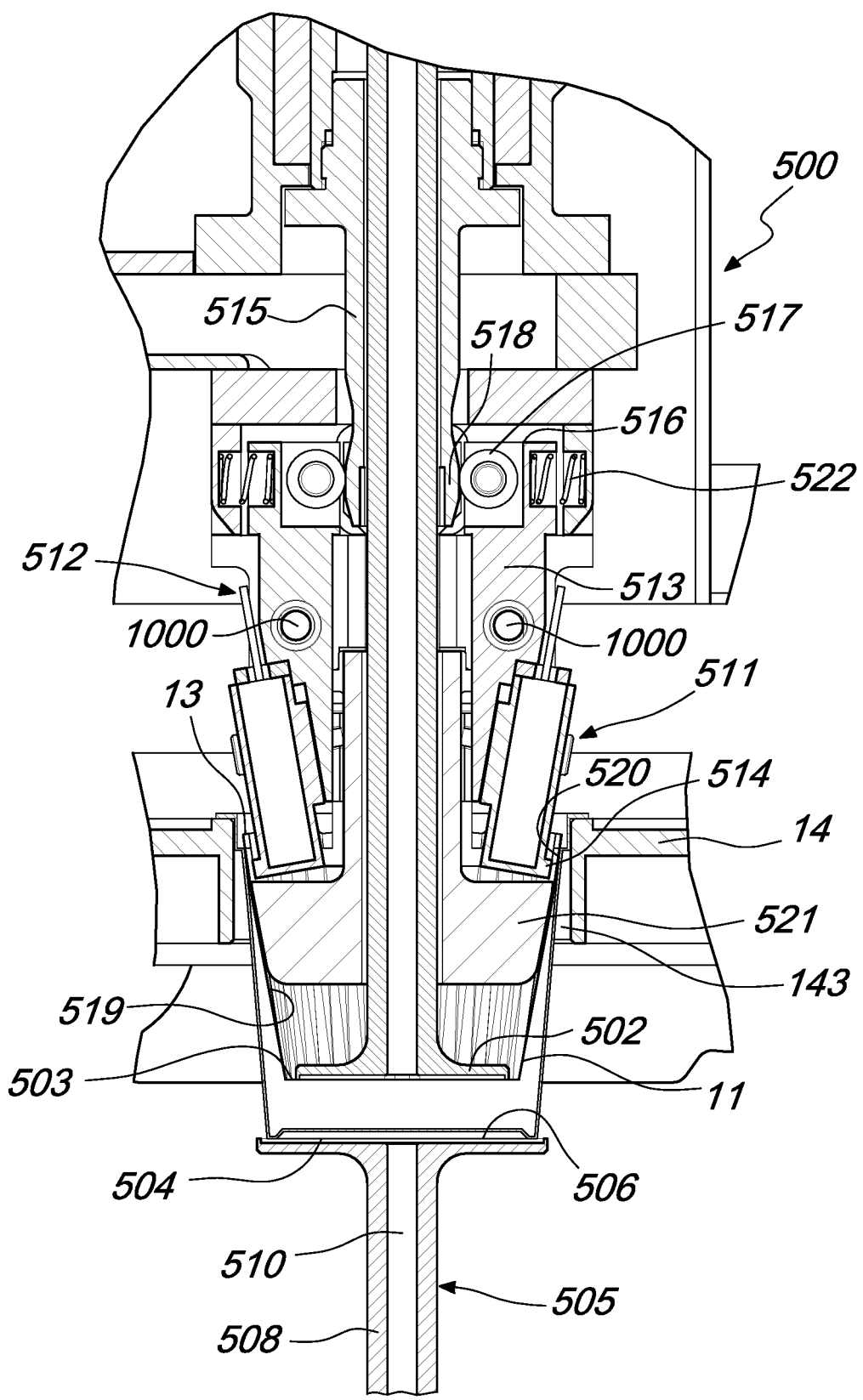
FIG. 3 is a sectional front view, taken along a substantially transverse plane, of the station of FIG. 1 in an intermediate configuration of mutual calibrated arrangement of an external body and of a bag.

As can be deduced in particular from FIG. 3, the supporting frame 12 comprises an intermediate wall 121, which in particular is extended longitudinally and separates actuations 9 of the apparatus 10 from the working stations of the apparatus.

In FIG. 1, the reference numeral 151 designates guiding rollers for the path of the ribbon 15 of filter material toward and from the operating units 160.

In particular, the first unit 160 for the provision and insertion of the bags 13 acts on first external bodies 11 of capsules, while the second unit 160 for the provision and insertion of the bags 13 acts on second external bodies 11 of capsules, the first external bodies 11 of capsules being offset with respect to the second external bodies 11 of capsules along the advancement direction A, particularly transversely to the advancement direction A.

Correspondingly, as will become better apparent from the continuation of the present description, respective parts or components of the first and second operating units 160, 160 for the provision and insertion of the bags 13 are mutually offset transversely to the advancement direction A.

In particular, as shown, the first working unit 160 operates on three first external bodies 11, while the second unit 160 acts on three second external bodies 11, which however are arranged on rows that are interposed or staggered with respect to the rows of the first three external bodies 11 on which the first unit 160 works.

Figure 4:
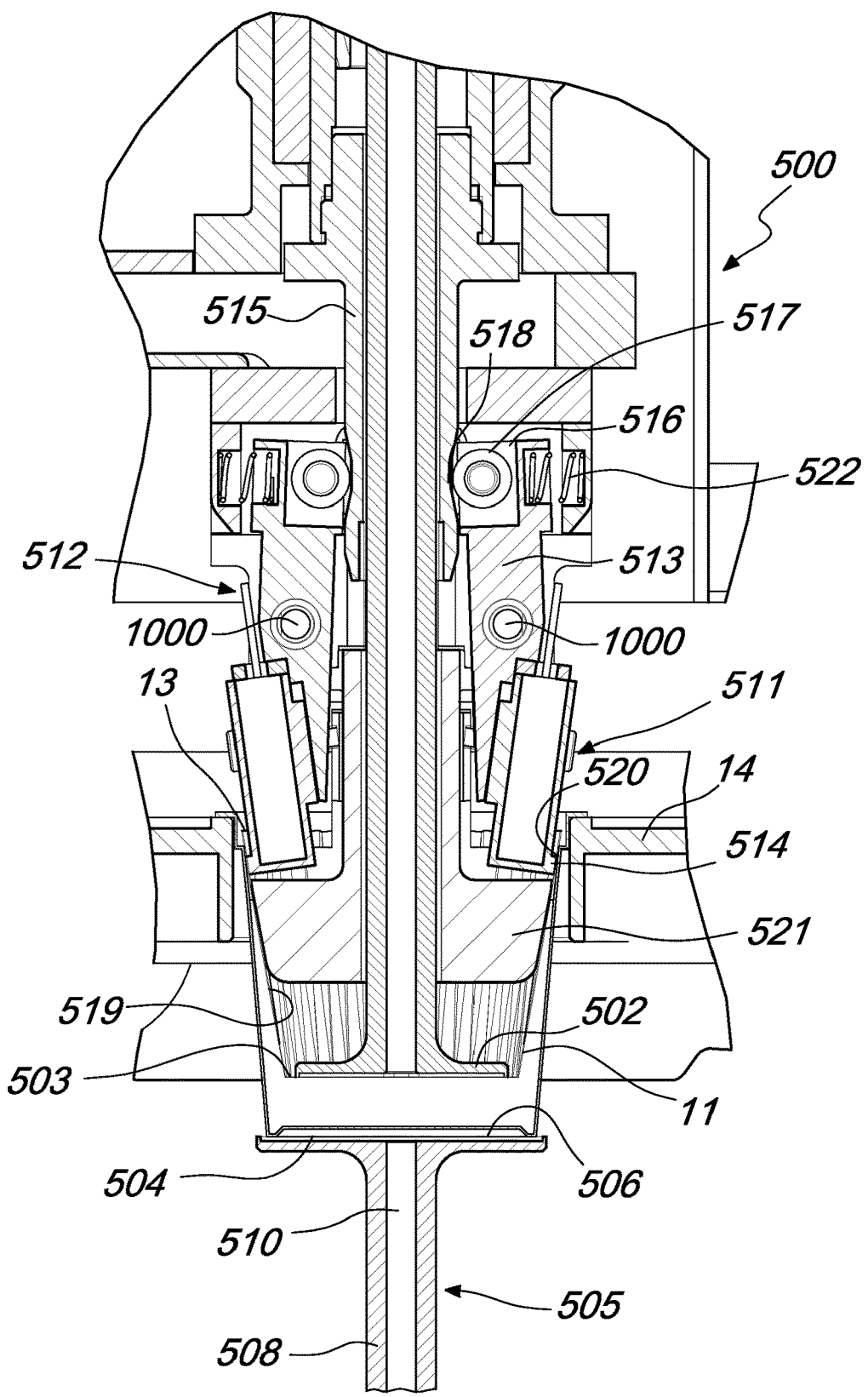
FIG. 4 is a sectional front view, taken along a substantially transverse plane, of the station of FIG. 1 in a configuration for heat-sealing the bag to the external body.
Figure 5:
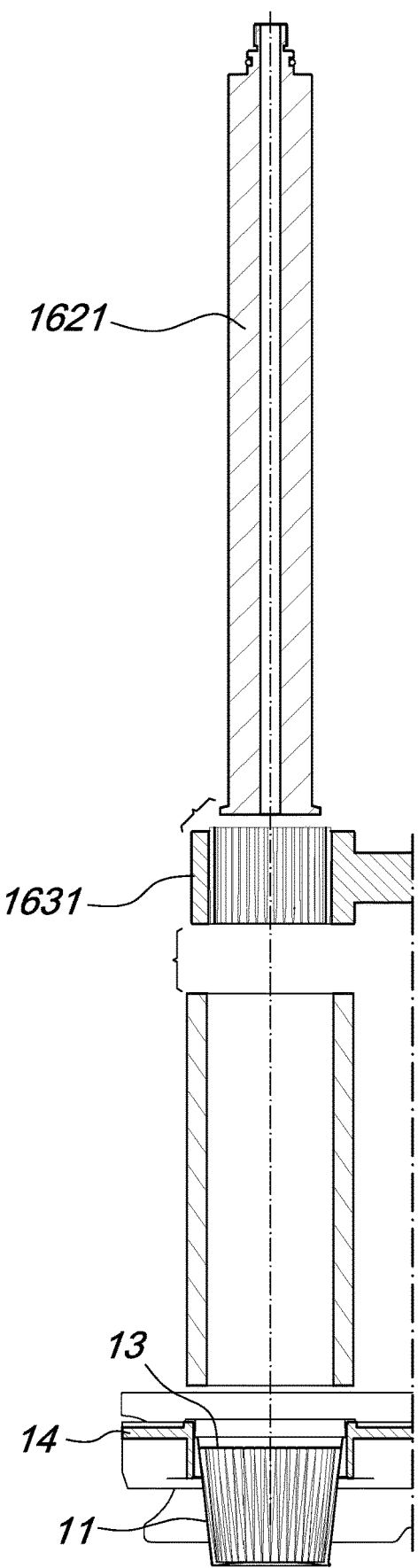
FIG. 5 is a schematic sectional front view, taken along a substantially transverse plane, of a pusher adapted to insert the bag in the external body.

As shown clearly by FIG. 4, the first and second devices 161, 161 for providing the bags 13 of the first unit and of the second unit 160, 160 are provided mutually adjacent so as to separate, in particular cut, from a single ribbon 15 of filter material corresponding portions 17, particularly having a disk-like or circular shape, in order to provide corresponding bags 13.

Advantageously, the devices 161, 161 for providing the bags 13 cut, in the ribbon 15 of filter material, respective portions 17 for a bag 13, which are provided mutually staggered, in particular along a direction that is transverse to the advancement direction A. In this manner it is possible to achieve better use of the ribbon 15, with an advantageous saving in material.

In particular, advantageously, the devices 161, 161 for providing the bag of the first and second units 160, 160 comprise respective elements 1610 for cutting respective portions 17 for bags 13, said cutting elements 1610 being arranged so as to provide respectively first portions 17 and second portions 17. The first portions 17 and the second portions 17 are mutually spaced along the advancement direction A and are mutually offset along a direction that is transverse to the advancement direction A.

The cutting elements 1610 of the first devices 161 for providing the first working unit 160 are substantially aligned along a first direction Y1, which is advantageously perpendicular to the advancement direction A of the external bodies 11, while the cutting elements 1610 of the second provision devices 161 of the second working unit 160 are substantially aligned along a second direction Y2, which is parallel to the first direction Y1 and advantageously perpendicular to the advancement direction A.

Consequently, the first portions 17 provided by the cutting elements 1610 of the first provision devices 161 of the first working unit 160 have centers that lie on the first direction Y1, and the second portions 17 for a bag provided by the cutting elements 1610 of the second provision devices 161 of the second working unit 160 have centers that lie on the second direction Y2, respectively.

Advantageously, the first direction Y1 and the second direction Y2 are spaced by less than the diameter of a portion 17 for a bag.

In general, in alternative embodiments which are not shown, the cutting elements 1610 can be adapted to provide portions 17 that have a noncircular shape. In these alternative embodiments, the cutting elements 1610 of the first provision device 161 provide first noncircular portions 17 that are aligned along the first direction Y1, while the cutting elements 1610 of the second provision device 161 provide second noncircular portions 17 that are aligned along the second direction Y2, the first direction Y1 and the second direction Y2 being spaced by less than a maximum distance along the advancement direction A of the noncircular portions 17.

In general, providing the cutting elements 1610 of the first working unit 160 and the cutting elements 1610 of the second working unit 160 so that they are offset transversely to the advancement direction A allows to minimize waste. In other words, it is possible to provide portions 17 on the ribbon 15 that are spaced by less than the distance of two successive rigid bodies 11 arranged on a same row of the advancement means 14.

In this manner it is possible to use a ribbon 15 that has reduced transverse dimensions and at the same time utilize said ribbon 15 in an optimum manner also along the advancement direction A.

In detail, the cutting elements 1610 comprise a blade or punch 1611, which is advantageously circular and cooperates with a complementary blade or die 1612.

The die 1612 is advantageously arranged at an upper end of formation means, advantageously a formation hopper 1613, in which the portion 17 for the bag 13 is pushed by pusher means so as to be shaped correspondingly like a cupcake liner. Advantageously, the pusher means comprise a corresponding piston 1614. The piston 1614 can move coaxially to the respective punch 1611.

The device 161 for providing the bag 13 comprises, therefore, at least one piston 1614 adapted to engage a face, particularly an upper face, of the portion 17 for the bag and to push said portion 17 for the bag into the corresponding formation means, advantageously into the formation hopper 1613.

Advantageously, the device 161 for providing the bag 13 comprises following elements, which cooperate with the pusher means, in order to follow the portion 17 for the bag through the corresponding shaping means 1613.

In particular, the following elements comprise an additional piston 1615, which is adapted to engage a face, particularly a lower face, of the portion 17 for the bag. The additional piston 1615 is adapted to follow the portion 17 for the bag through the formation hopper 1613.

In practice, by retaining the portion 17 for the bag between opposite means during insertion within the formation means 1613, said portion 17 is prevented from remaining retained or jammed on one side with consequent provision of deformed or not entirely formed bags, as instead occurs in the machine according to the background art.

In particular, the additional piston 1615 can move between a raised position, in which it is extended within the formation hopper 1613, and a lowered position for transferring the cupcake liner-shaped bag 17 to the conveyance device 163.

The additional piston 1615 is moved in phase coordination with the piston 1614 in order to convey the portion 17 gradually into the formation means 1613.

In other words, the additional piston 1615 is moved in phase coordination with the piston 1614 in order to clamp and force the portion 17 within the formation means or formation hopper 1613.

During the formation step, the portion 17 is retained by and between the pusher means and the following elements, advantageously between the piston 1614 and the additional piston 1615.

The formation hopper 1613 comprises adapted protrusions for bending the portion 17 like a cupcake liner.

As can be deduced, the additional piston 1615, while it accompanies the portion 17, by moving vertically, passes through a corresponding seat 1631 of the conveyance devices 163 that is arranged below the formation hopper 1613.

Figure 6:
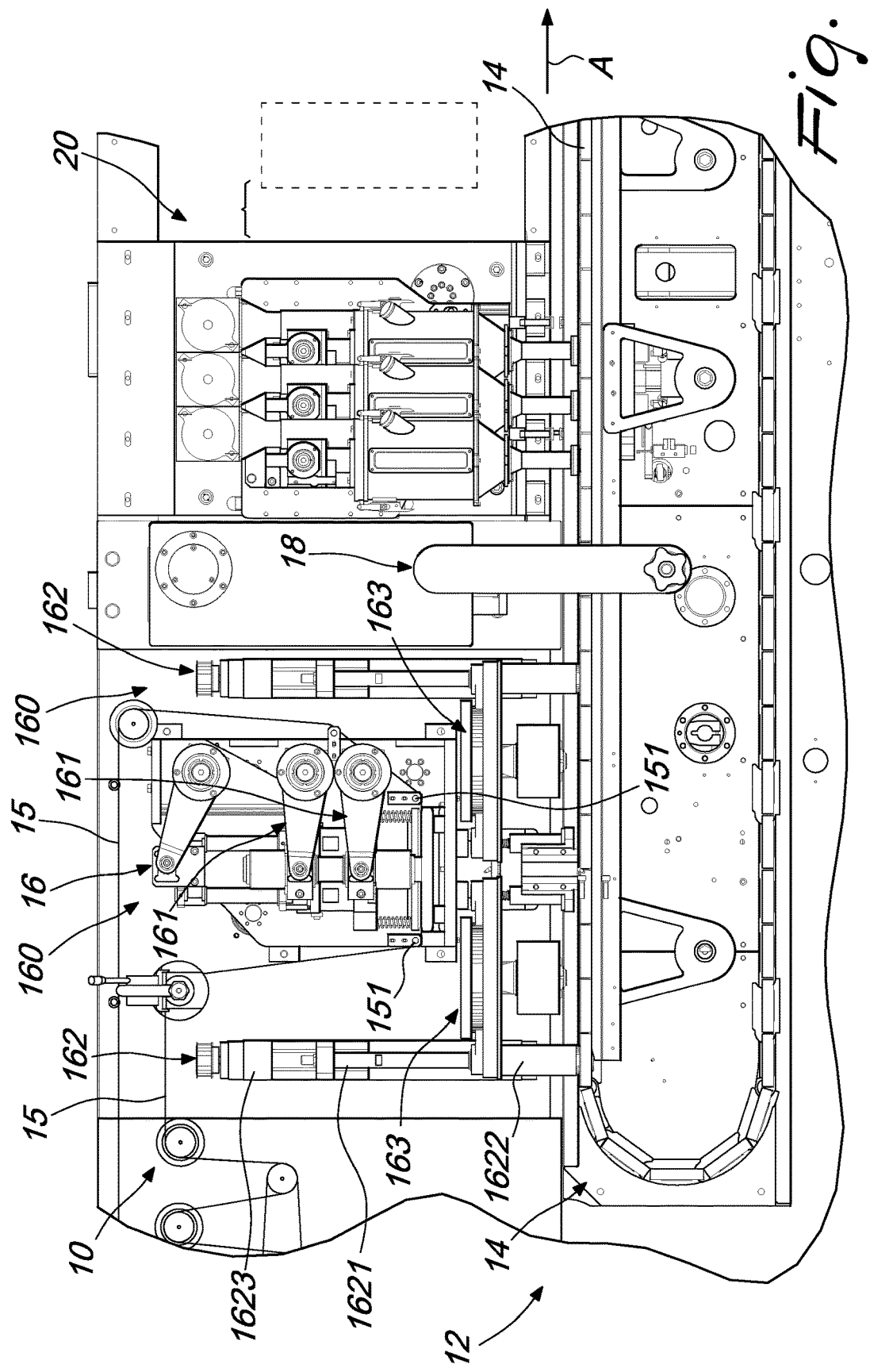
FIG. 6 is a front view of a preferred embodiment of the apparatus according to the present disclosure.
Figure 7:
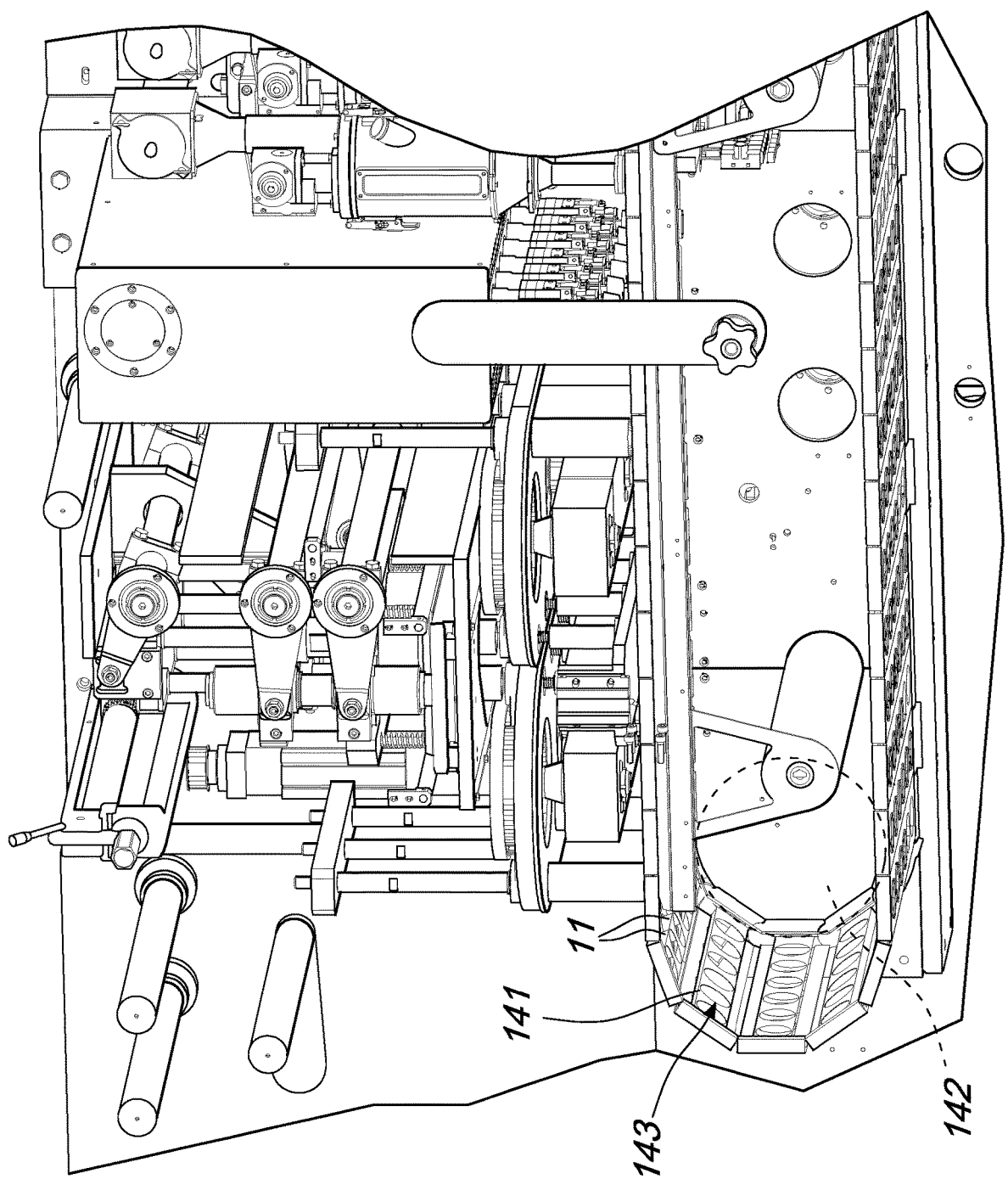
FIG. 7 is a schematic perspective view of a provision and insertion region of the apparatus of FIG. 6.
Figure 8:
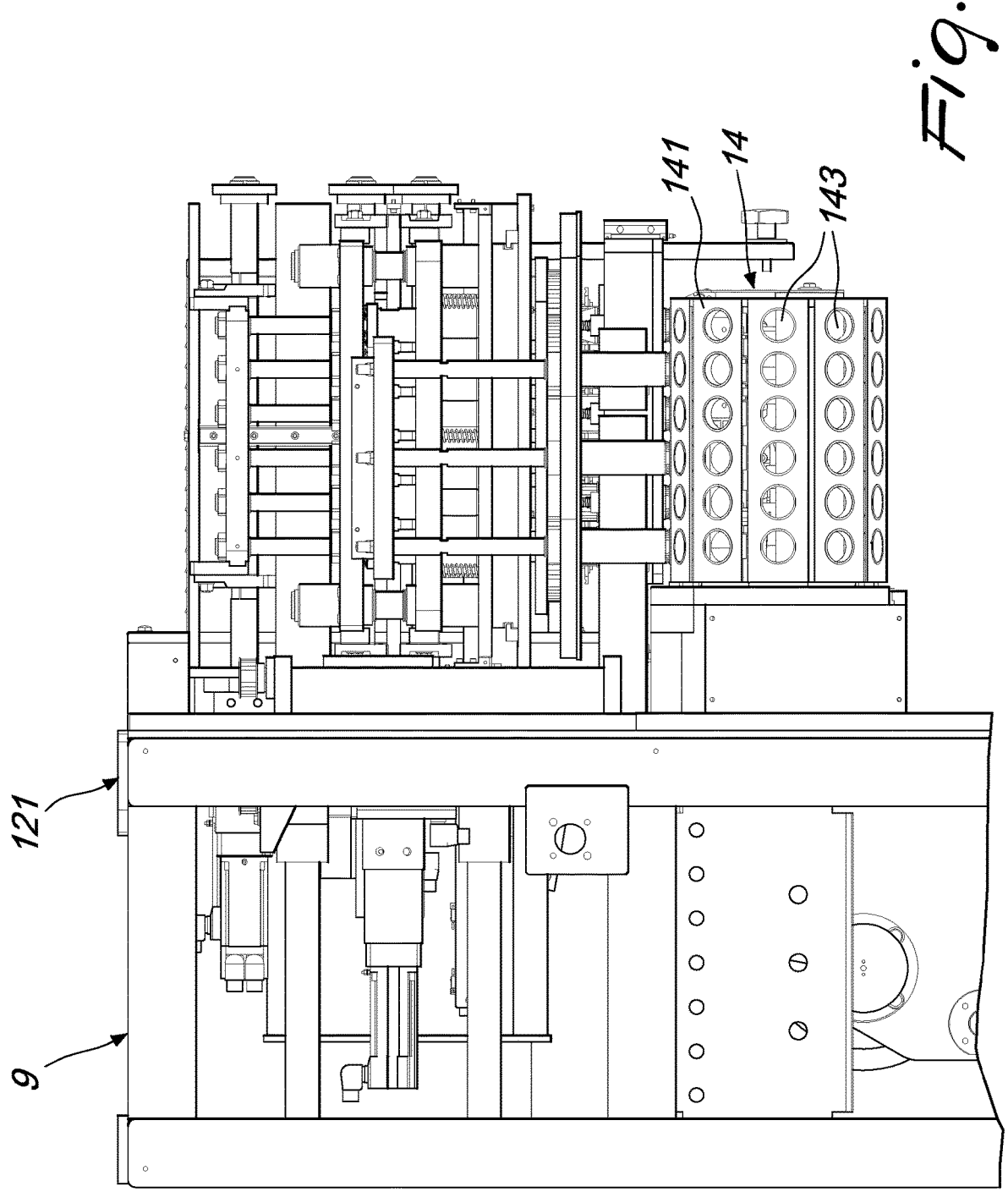
FIG. 8 is a side view of the apparatus of FIG. 6.
Figure 9:
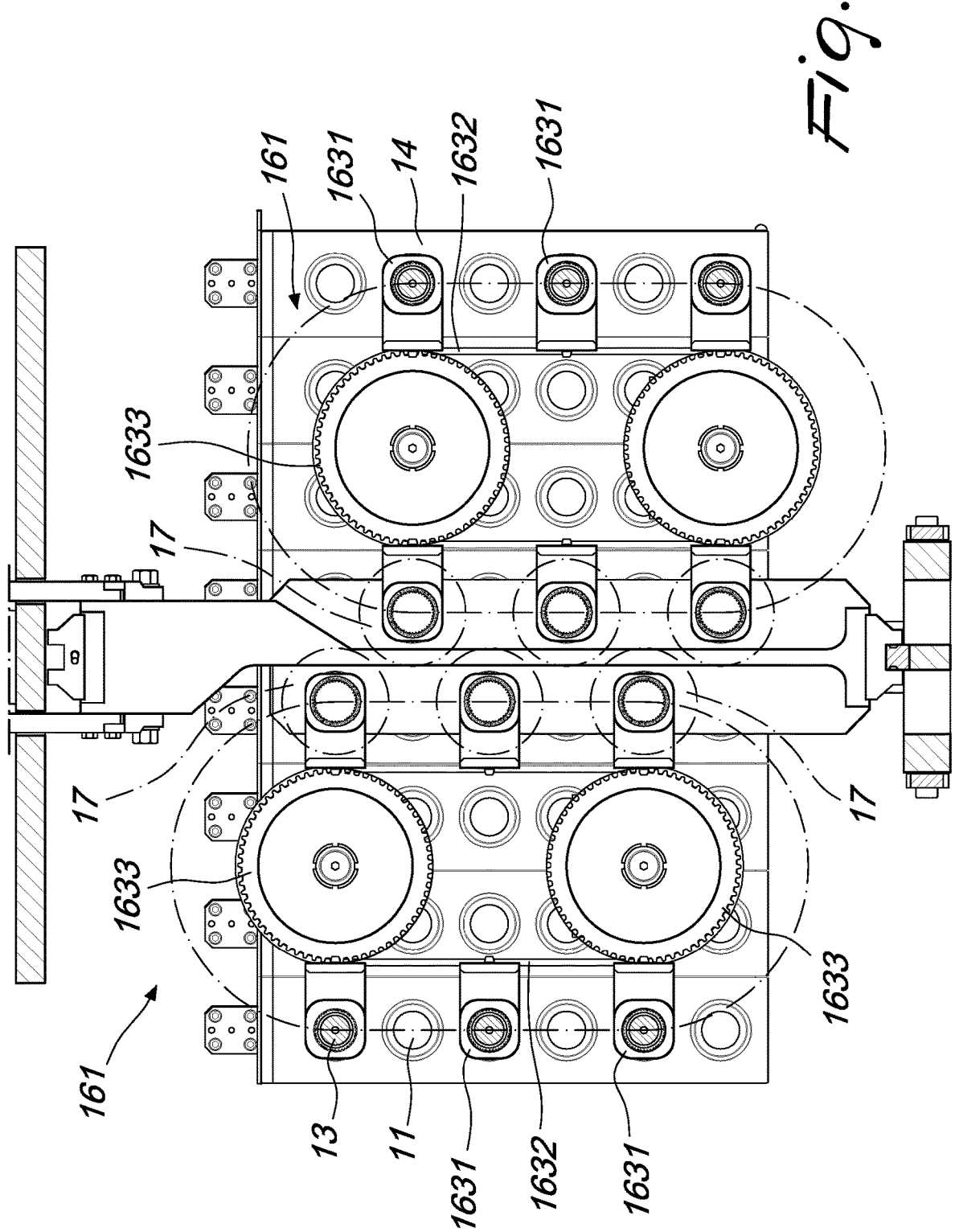
FIG. 9 is a schematic top plan view of the bag provision and insertion region.
Figure 10:
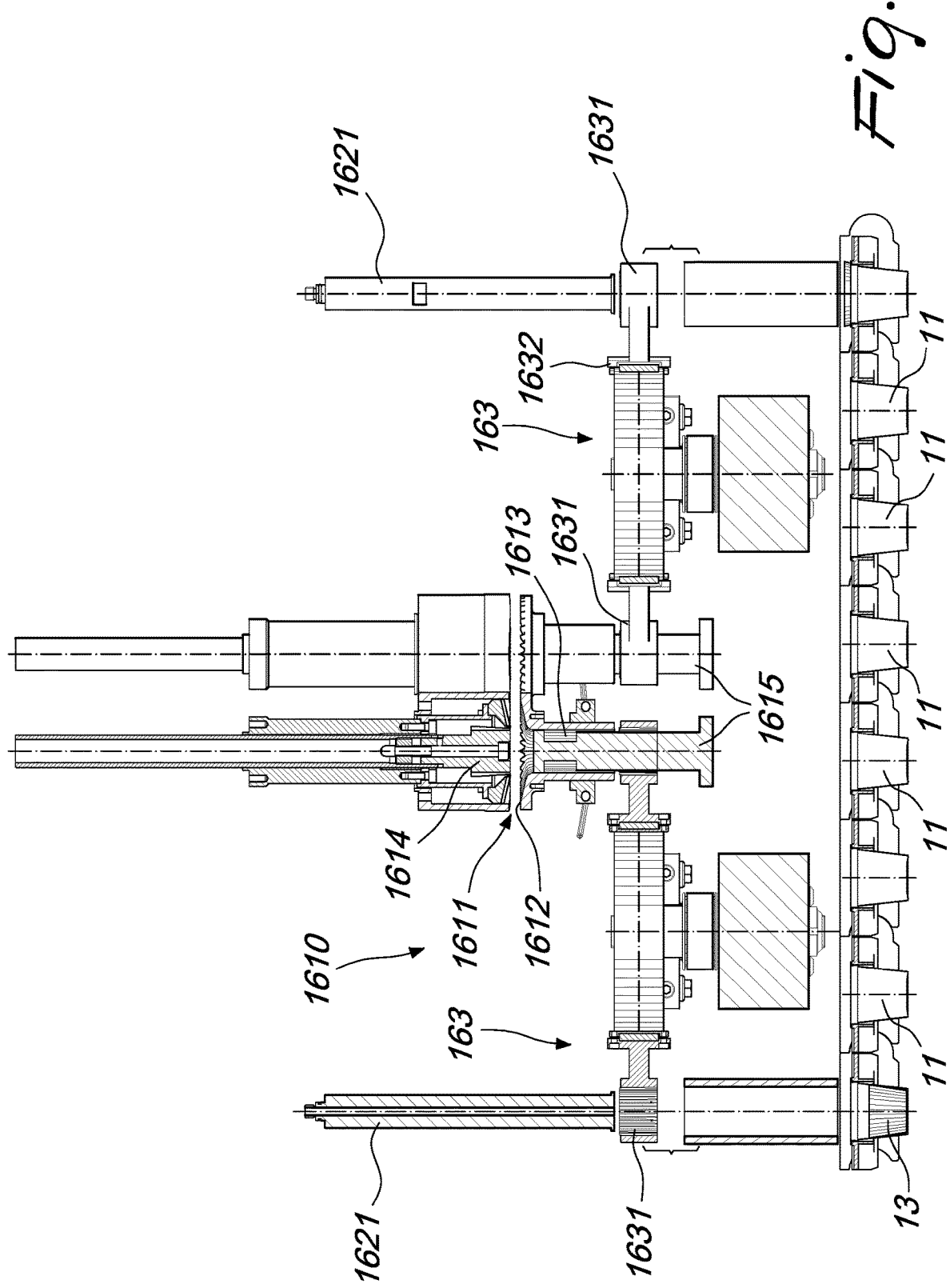
FIG. 10 is a schematic partially sectional front view of a first operating condition of a working unit for provision and insertion, with some components omitted for the sake of simplicity.
Figure 11:
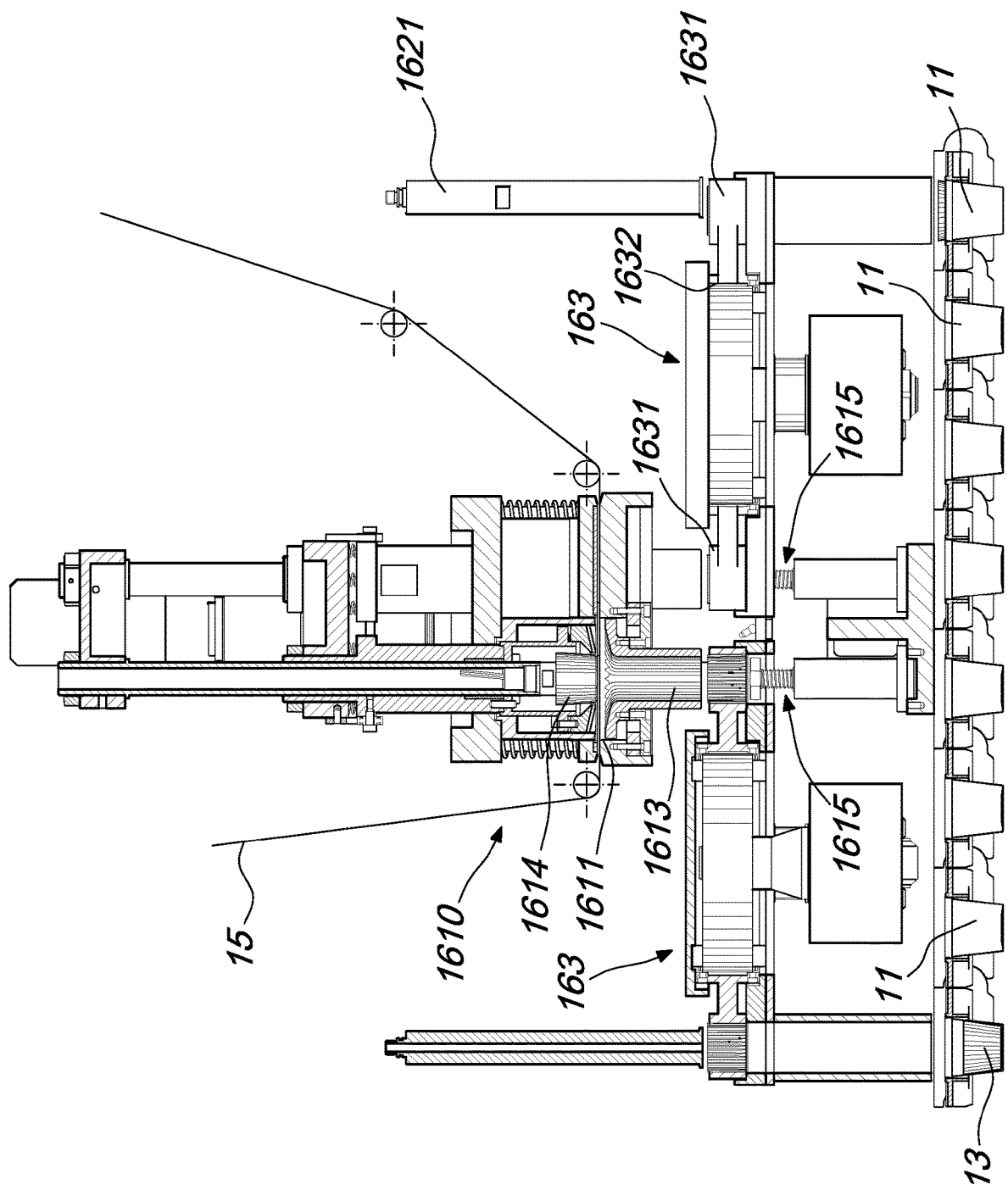
FIG. 11 is a partial sectional view, related to a second operating condition of the working unit for provision and insertion, with some components omitted for the sake of simplicity.
Figure 12:
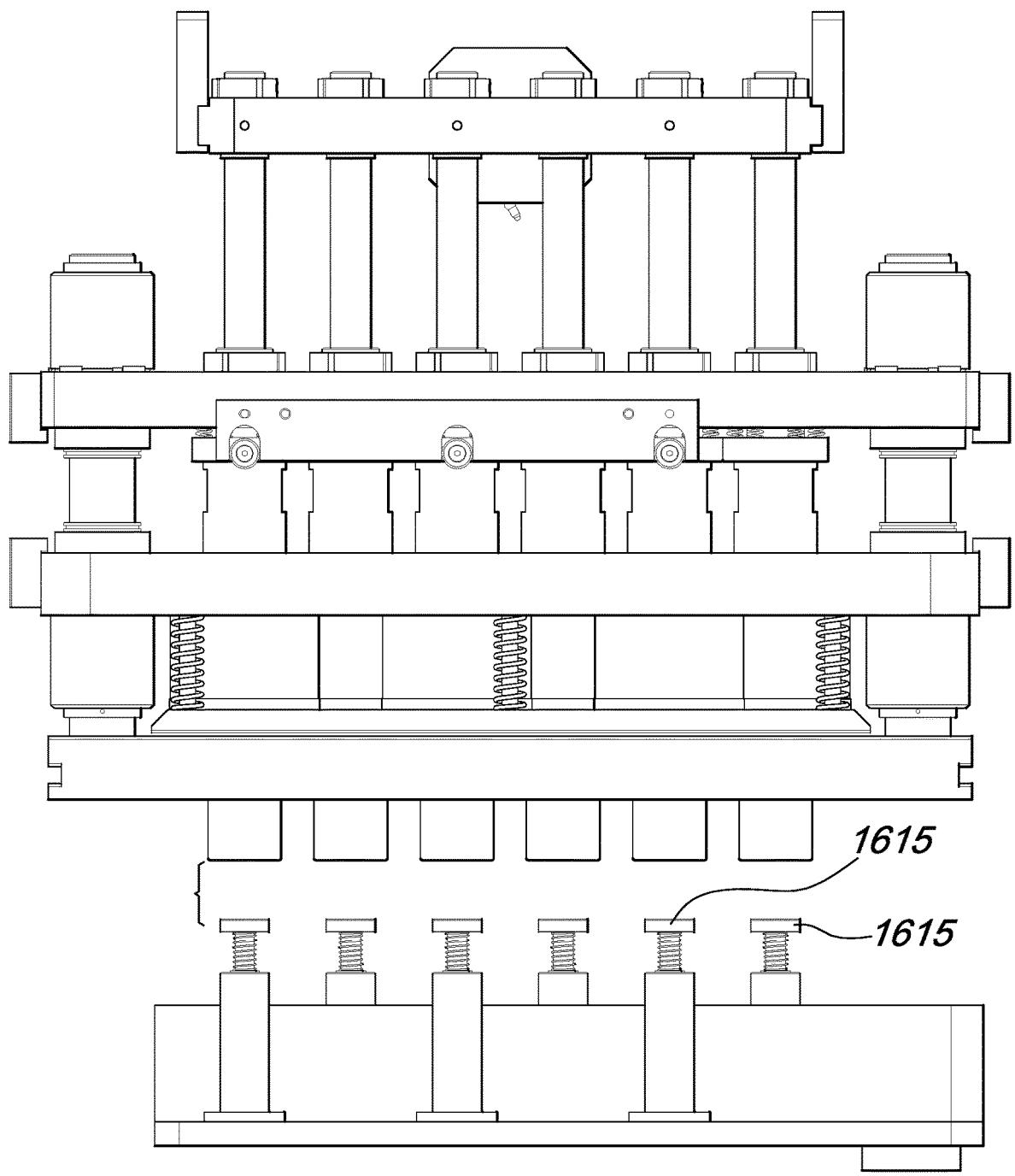
FIG. 12 is a schematic side view of a region for following the bags being formed in the preferred embodiment of the apparatus according to the present disclosure.

In the lowered position, shown in FIG. 6, the additional piston 1615 lies below the corresponding seat 1631 of said conveyance means 163, without interfering with the conveyance means 163 that transfer the bags 13 toward insertion means 162.

Advantageously, as shown, the conveyance device 163 moves on a horizontal plane. Advantageously, said horizontal plane is parallel to a plane on which the external bodies 11 of the capsules lie, i.e., above the means 14 for the advancement of the external bodies 11 and below the formation hopper 1613.

The conveyance device 163 comprises an endless supporting belt 1632, which is supported by corresponding toothed pulleys for driving and traction 1633, said endless supporting belt 1632 supporting a plurality of seats 1631, which are adapted to be arranged alternatively at the provision means 161 and at the insertion means 162. The endless supporting belt 1632 moves the plurality of seats 1631 on a horizontal plane that is parallel to the advancement direction A, i.e., above the advancement means 14 of the external bodies 11 and below the formation hopper 1613.

In detail, the respective seat 1631 of said conveyance means 163 comprises a corresponding through hole for accommodating the bag 13, which is sized appropriately in order to retain by interference the respective bag 13.

As mentioned, the apparatus shown in the figures comprises a first conveyance device 163 and a second conveyance device 163, which comprise respectively a first endless supporting belt and a second endless supporting belt 1632, which rotate in opposite directions on a horizontal plane above the advancement means 14. As an alternative, the endless supporting belts rotate in the same direction. Each endless supporting belt 1632 supports at least one seat 1631. Advantageously, each belt supports a plurality of seats 1631.

In particular, the first endless supporting belt 1632 supports a first series of seats 1631 and the second endless supporting belt 1632 supports a second series of seats 1631.

Advantageously, the first series of seats 1631 conveys the bags 13 from the first provision device 161 of the first working unit 160 upstream of the advancement direction A at the first insertion device 162, while the second series of seats 1631 conveys the bags 13 from the second provision device 161 of the second working unit 160 downstream with respect to the advancement direction A at the second device for insertion of the bag 162.

Advantageously, the first and second devices 162, 162 for insertion of the bag 13 within the external body 11 of the capsule comprise respective first and second means for engaging and pushing the bag shaped like a cupcake liner within the respective external body 11 of the capsule.

Advantageously, the means for engaging and pushing the cupcake liner-shaped bag into the respective external body 11 of the capsule comprise respective pushers, for example respective pistons that pass through the respective seat 1631 for supporting the conveyance devices 163. The engagement and pushing devices are also adapted to pass through a corresponding tubular body 1622 that is provided between the respective supporting seat 1631 of the conveyance devices 163 and the accommodation and support seat 143 of the advancement means 14.

As shown, the means for engaging and pushing the cupcake liner-shaped bags into the respective external body of the capsule are supported by a corresponding and common frame 1623, which is actuated by a corresponding crank system 1624.

In the illustrated embodiment, the first and second engagement and pushing means each comprise three pushers 1621.

In turn, the pushers 1621 are actuated along vertical directions, in order to push downward the bags 13 within a respective external body 11.

Advantageously, the pushers 1621 are adapted to push the bottom 503 of the bag 13 into contact with the base 504 of the external body 11. In particular, the pushers 1621 make contact with (and support) the inner surface of the bottom 503 of the bag 13 and move the external surface of the bottom 503 of said bag 13 into contact with the inner face of the base 504 of the external body 11.

Advantageously, the pushers 1621 of the first and second engagement and pushing means are arranged on rows that are transverse to the advancement direction A of the external bodies 11. In particular, the pushers 1621 of the first engagement and pushing means are arranged along a first row upstream of the respective first device 161 for providing the bag 13, while the pushers 1621 of the second engagement and pushing means are arranged along a second row downstream of the respective second device 161 for providing the bag 13.

In particular, the pushers 1621 of the first row are arranged in alternating rows of seats 143 and likewise the pushers 1621 of the second row are arranged on rows of seats 143 that are alternated and different from those of the first row of pushers 1621.

In other words, a first half of the external bodies that are present on an articulated sector of the endless conveyor belt 141 is fed with a respective bag 13 by the first row of pushers 1621, while a second half of external bodies that are present on the articulated sector of the endless conveyor belt 141 is fed with a respective bag 13 by the second row of pushers 1621.

According to the disclosure, a method is also provided for preparing a product for infusion or extraction in a capsule, advantageously a single-use capsule for infusion or extraction beverages, which comprises an external body 11 and a bag 13 of suitable porous and/or filtering material that is shaped like a cupcake liner.

The method according to the disclosure comprises the steps of feeding a plurality of external bodies 11 of capsules according to a plurality of parallel rows within respective seats 143 of means 14 for advancement along an advancement direction A; of feeding a ribbon 15 of filter material; of obtaining by cutting from the ribbon of filter material a plurality of portions 17 adapted to provide a bag shaped like a cupcake liner; bending the portions 17 so as to form corresponding bags 13 shaped like a cupcake at a device 161 for providing the bag 13; inserting the bags 13 in corresponding seats 1631 of a conveyance device 163; moving the seats 1631 upstream or downstream of the device 161 for providing the bag 13 with respect to the advancement direction A in order to position the bags 13 above corresponding external bodies 11; and inserting the bags 13 within corresponding external bodies 11 that are accommodated within respective seats 143 of the advancement means 14.

Advantageously, the step of bending the portions 17 so as to form corresponding bags 13 shaped like cupcake liners comprises clamping the portions 17 between pusher means, for example a piston 1614, which are adapted to engage an upper face of the portion 17, and engagement means, for example an additional piston 1615, which is adapted to engage a lower face of the portion 17 and force the portion 17 thus clamped within formation means, for example a formation hopper 1613.

Advantageously, the step of providing by cutting from the ribbon 15 of filter material a plurality of portions 17 adapted to provide a bag 13 shaped like a cupcake liner comprises providing, by cutting, first portions 17 that are aligned along a first direction Y1 and second portions 17 that are aligned along a second direction Y2 that is parallel to the first direction Y1.

Advantageously, the first direction Y1 and said second direction Y2 are mutually parallel and transverse to the advancement direction A.

As shown previously, it is possible to provide by cutting first portions 17 and second portions 17 from a same ribbon 15 of filter material. Advantageously, the first portions 17 are offset with respect to the second portions 17 along a direction that is perpendicular to the advancement direction A.

Advantageously, the method comprises inserting the bags 13 provided from the first portions 17 within first external bodies 11 and the bags 13 provided from the second portions 17 within second external bodies 11, the first external bodies 11 being offset along the advancement direction A with respect to the second external bodies 11.

Advantageously, the first external bodies 11 are arranged upstream of the second external bodies 11.

Efficiently, the present disclosure solves the problems described previously, by devising a calibrated coupling station 500 for components of capsules that allows to establish precisely the mutual position of the external body 11 and of the bag 13.

Conveniently, the calibrated coupling station 500 ensures production with a provision quality that is constant over time by way of the retention of the body 11 and of the bag 13 respectively by way of the retention member 505 and of the grip element 501 and their mutual blocking by means of a plug 521 before performing heat-sealing.

Positively, the apparatus 10 according to the disclosure ensures the correct provision of the frustum-like shape with pleated side walls (a so-called "cupcake liner" configuration) of the bag 13 in order to avoid problems of incorrect heat-sealing thereof to the body 11, producing a reduction of the quantity of packages of poor quality or to be discarded that are produced with a corresponding reduction of consequent machine downtimes.

Usefully, the apparatus 10 does not require the use of complex and expensive devices for arranging/placing the bag 13 within the body 11.

Advantageously, the apparatus 10 ensures that the provision and insertion of the bag 13 in the external body 11 are simple and do not require components that entail difficult assembly and complex maintenance and repair. In particular, the insertion of the bag 13 in the body 11 is total, i.e., the bag 13 is inserted fully within the body 11, since the correct mutual arrangement of said two components is performed subsequently, in the station 500, which allows to move the bottom 503 and the base 504 to the predefined distance set by the design, particularly to space the bottom 503 from the base 504.

Validly, the station 500 for calibrated coupling and the apparatus 10 for packaging said capsule components have low costs and are relatively simple to provide in practice and safe in application.

The disclosure thus conceived is susceptible of numerous modifications and variations, all of which are within the scope of the appended claims; all the details may further be replaced with other technically equivalent elements.

In the exemplary embodiments shown, individual characteristics, given in relation to specific examples, may actually be interchanged with other different characteristics that exist in other exemplary embodiments.

In practice, the materials used, as well as the dimensions, may be any according to requirements and to the state of the art.

The invention claimed is:

1. A calibrated coupling station for components of capsules, the capsules comprising an external body and a bag made of filter material, the coupling station comprising a through seat for stably housing said external body that supports said bag, said through seat being arranged on an articulated sector of an advancement element movable along a frame, the coupling station further comprising at least one grip element with a terminal end aligned with a predefined stop area where said through seat stops, the coupling station further comprising a heat-sealing assembly, the grip element being movable by a first actuation assembly, from a raised configuration in which the terminal end faces and is proximate to and above said through seat, to a lowered configuration in which the terminal end is arranged within said through seat and rests on a bottom of the bag, in turn juxtaposed against an inner face of a base of the external body, wherein the grip element is configured to reach an intermediate configuration, arranged within said through seat, between the lowered and raised configurations, at a distance from the base of the external body higher than the lowered configuration, for calibrated positioning in which said terminal end, stably coupled to the bottom of said bag, is arranged at a predefined distance from the inner face of the base of the external body, said terminal end of the grip element being configured to retain said bag when said grip element moves from the lowered configuration up to the intermediate configuration, and wherein said heat-sealing assembly is translatable coaxially with the grip element within said through seat when the grip element is in said intermediate configuration so as to heat seal an external lateral surface of the bag against an internal lateral wall of the external body when the bag is retained by the terminal end of the grip element.

2. The calibrated coupling station according to claim 1, further comprising at least one lower retention member aligned with said predefined stop area of said through seat, the lower retention member comprising a respective terminal end and being movable, by the action of a second actuation assembly, from a lowered configuration in which said respective terminal end of said lower retention member faces and is proximate to said through seat, said respective terminal end of said lower retention member being arranged below said through seat, to a raised configuration in which said respective terminal end of said lower retention member contacts an external face of the base of the external body, said lower retention member and said grip element defining said intermediate configuration for calibrated positioning in which the terminal end of the grip element, stably coupled to the bottom of the bag, is arranged at the predefined distance from the inner face of the base of the external body, the external face of which is stably coupled to the terminal end of said lower retention member.

3. The calibrated coupling station according to claim 2, wherein the terminal end of the grip element and the terminal end of the lower retention member have a substantially disk-like shape, with a diameter smaller than a diameter of the bottom of the bag and of the base of the external body, respectively, against which they are juxtaposed in said intermediate configuration for calibrated positioning.

4. The calibrated coupling station according to claim 2, wherein said at least one grip element and said at least one lower retention member comprise, respectively, a first hollow shaft and a second hollow shaft, which translate with respect to said frame, in a direction that is perpendicular to a plane containing the articulated sector provided with said through seat, by a plurality of respective actuators, said first and second hollow shafts, which translate by the respective actuators, constituting said first actuation assembly and said second actuation assembly, respectively.

5. The calibrated coupling station according to claim 4, wherein said first and second hollow shafts have respective internal cavities, that lead, with the interposition of flow control valves, to respective pneumatic circuits in partial vacuum, and have, at respective terminal ends, corresponding openings towards an external environment.

6. The calibrated coupling station according to claim 4, wherein said heat-sealing assembly is fitted onto said first shaft, being coaxially translatable along it by the action of a third actuation assembly, the heat-sealing assembly being provided with a carousel comprising a plurality of carousel sectors defining a tubular cover, said plurality of carousel sectors being hinged by a plurality of respective pivots, heat-sealing wings being provided at a first end of the carousel sectors.

7. The calibrated coupling station according to claim 6, wherein said carousel is translatable coaxially to said first shaft along a sleeve that also is movable according to a stroke that is predefined and independent with respect to said first shaft, said carousel being movable towards a second end, which is opposite the first end, said carousel sector being provided, at the second end, with a feeler which is forced elastically against a contoured section of said sleeve, and wherein upon a vertical translation of said sleeve, while said carousel is kept motionless, said feeler translates in a radial direction with respect to said first shaft, remaining in resting contact against said contoured section, with consequent rotation of a corresponding carousel sector about the respective pivot, between a second limit configuration, in which said sealing wings face and are proximate to an internal lateral surface of said bag and a first limit configuration, in which said heat-sealing wings abut, by elastic forcing, against the internal lateral surface of said bag, pressing it against a-R the internal lateral wall of said external body.

8. The calibrated coupling station according to claim 7, wherein the heat-sealing assembly comprises a plug arranged below said heat-sealing wings so as to force and compress the external lateral surface of said bag against the internal lateral wall of said external body at said first limit configuration in which said heat-sealing wings abut, by elastic forcing, against the internal lateral surface of said bag, pressing said external lateral surface of said bag against the internal lateral wall of said external body.

9. The calibrated coupling station according to claim 7, wherein elastic elements are provided at the second end of the carousel sector and said carousel is configured to force said feeler against said contoured section of said sleeve that constitutes a cam.

10. The calibrated coupling station according to claim 7, wherein said feeler comprises an idle roller, which can rotate freely on the contoured section of the sleeve.

\* \* \* \* \*

UNITED STATES PATENT AND TRADEMARK OFFICE
CERTIFICATE OF CORRECTION

Page 1 of 1

PATENT NO. : 10,875,673 B2
APPLICATION NO. : 15/314427
DATED : December 29, 2020
INVENTOR(S) : Giorgio Manaresi and Luca Benni It is certified that error appears in the above-identified patent and that said Letters Patent is hereby corrected as shown below:

On the Title Page

Item (73) Assignee:
Please replace: [[GIMA S.P.A., Zola Predosa (IT)]] with --I.M.A. INDUSTRIA MACCHINE AUTOMATICHE S.P.A., Province of Bologna (IT)--

Signed and Sealed this
Thirteenth Day of April, 2021

Drew Hirshfeld
*Performing the Functions and Duties of the
Under Secretary of Commerce for Intellectual Property and
Director of the United States Patent and Trademark Office*